A. M. BUCHANAN.
Velocipedes.
No. 199,409. Patented Jan. 22, 1878.
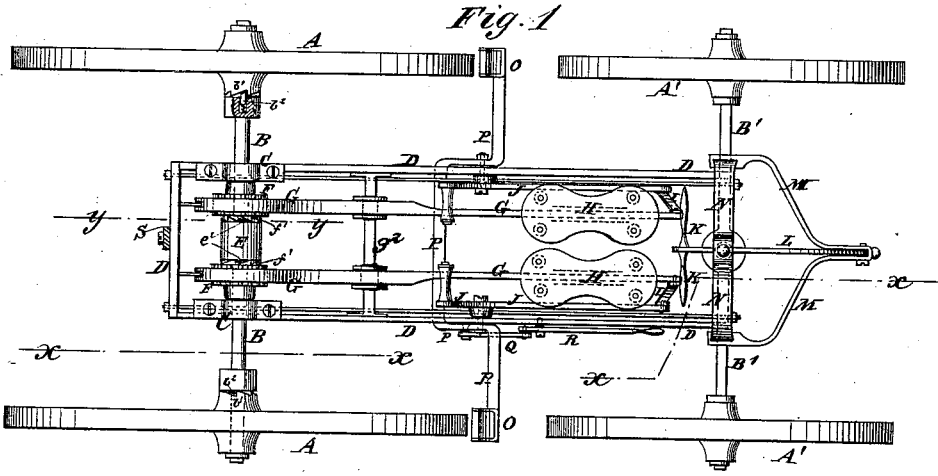
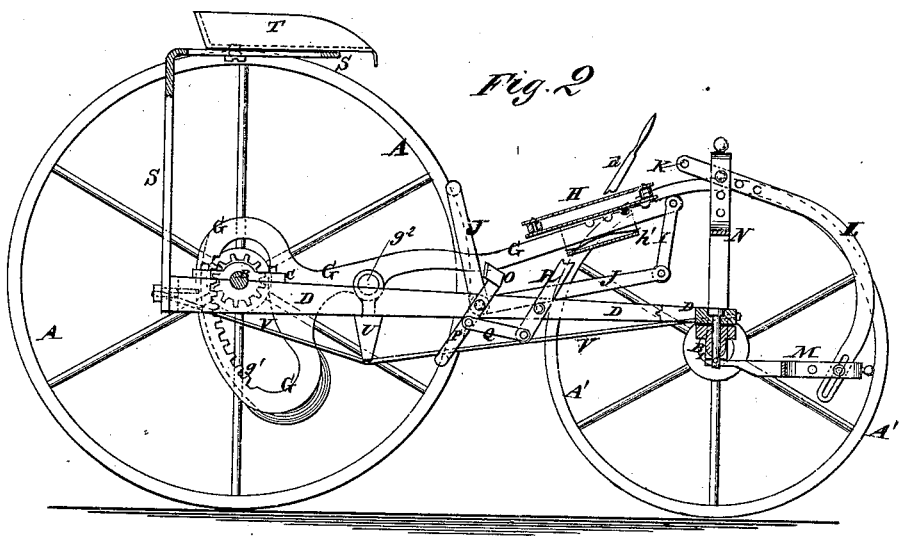
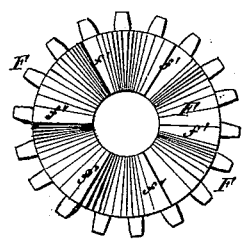
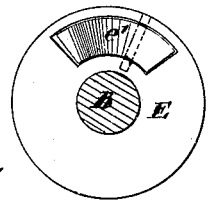
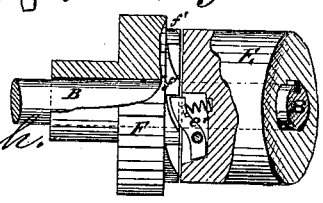
WITNESSES:
INVENTOR:
A. M. Buchanan.
BY
ATTORNEYS.

UNITED STATES PATENT OFFICE.

ALONZO M. BUCHANAN, OF MOBERLY, MISSOURI.

IMPROVEMENT IN VELOCIPEDES.

Specification forming part of Letters Patent No. 199,409, dated January 22, 1878; application filed June 4, 1877.

*To all whom it may concern:*

Be it known that I, ALONZO MONROE BUCHANAN, of Moberly, in the county of Randolph and State of Missouri, have invented a new and useful Improvement in Lever-Power Carriage, of which the following is a specification:

Figure 1 is a top view of one of my improved carriages. Fig. 2 is a side view of the same, partly in section, through the broken line $x\ x\ x\ x$, Fig. 1. Fig. 3 is a side view of one of the gear-wheels, showing its clutch-teeth. Fig. 4 is a detail view of the clutch-collar, the axle being shown in section through the line $y\ y$, Fig. 1. Fig. 5 is a detail view of the axle, clutch-collar, and one of the gear-wheels, parts being broken away to show the construction.

Similar letters of reference indicate corresponding parts.

The object of this invention is to furnish carriages for use upon all kinds of roads, streets, and tracks, which shall be so constructed that the weight of the operator placed upon levers shall be the propelling power, giving a regular, continuous motion, and being without any dead or weakened points.

The invention will first be described in connection with the drawing, and then pointed out in the claims.

A are the rear wheels, and A' are the forward wheels. B is the rear axle, and B' is the forward axle. Upon the inner ends of the hubs of the rear wheels A are formed clutch-teeth $b^1$, to receive clutch-pins $b^2$ inserted in holes in the collars of the axle B, and held out by spiral or other springs placed in the inner ends of the said holes.

This construction causes the axle B to carry the wheels A with it in its forward revolution, and allows one of said wheels to turn faster than the other in turning around, running upon curved lines, &c.

The axle B revolves in bearings C attached to the upper sides of the rear parts of the side bars of the frame D. The center of the forward cross-bar of the frame D is connected with the center of the forward axle B' by a king-bolt, in the usual way.

To the center of the rear axle B is attached a collar, E, in recesses in each end of which are pivoted small clutch-blocks $e'$, near their rear ends. The forward ends of the clutch-blocks $e'$ are held out, as shown in Fig. 5, by spiral or other springs placed in said recesses beneath said ends.

The clutch-blocks $e'$ engage with clutch-teeth $f'$ formed upon the inner sides of the gear-wheels F, so that the said gear-wheels may carry the said axle with them in their forward revolution, but may be turned back without moving the said axle.

G are two levers, having curved cross-heads formed upon or attached to their rear ends, and in which are formed slots curved upon the arc of a circle having its center in the fulcrum of the levers G, and having teeth $g'$ formed in its outer or concave edge, to mesh into the teeth of the gear-wheels F, the said slots being made wide enough to receive the said gear-wheels. The levers G, at points at the distance of about one-third their length from their rear ends, are pivoted to a cross-bar, $g^2$, attached to the side bars of the frame D, or to supports attached to said side bars.

The rear or cross-head ends of the levers G are made heavy, so as to drop when pressure is removed from their forward ends.

Upon the forward parts of the levers G are placed the foot-rests H, which are formed of two parallel plates, having rubber or other springs interposed between them, so that the feet may remain horizontal, or nearly so, while working the levers G.

To the lower side of the lower plate of the foot-rests H are attached long sockets $h'$, to receive the forward parts of the levers G, said sockets being made deeper than the depth of the said levers G, so that the said foot-rests may be raised to move the cross-pin in the upper part of said socket from one to another of the notches in the upper sides of the levers G, to adjust the leverage as the weight of the operator or as the speed or power to be used may require.

The foot-rests H are held in place when adjusted by springs placed in the lower parts of the socket $h'$, and bearing against the lower side of the levers G. To the forward ends of the levers G are pivoted the upper ends of the short connecting-rods I, the lower ends of which are pivoted to the forward ends of the bent levers J. The levers J are pivoted at their angles to the frame D, and their other ends project upward, and have spools or foot-rests attached to their upper ends, so that they may be operated to operate the levers G and propel the carriage by an operator with his feet, while sitting upon the seat T. The seat T is secured to the slotted horizontal arm of the standard S by a set-screw, so that by loosening the said set-screw the said seat may be moved forward and back as the size of the operator may require. The lower end of the seat-standard S is bolted to the rear cross-bar of the frame D.

When the operator operates the carriage by standing upon the foot-rests H and throwing his weight alternately upon the levers G, he grasps with his hands the cross-bar or handle K, the middle part of which is secured to the upper end of the curved bar L, which passes through slots in the outer ends of the supporting-bars N M, where it is secured in place by bolts.

Several holes or slots are formed in the ends of the curved bar L, and also in the slotted ends of the supporting-bars N M, to receive the said bolts, so that the position of the handle K may be adjusted as the size of the operator may require. The bar N is vertical and the bar M horizontal, and their inner parts are forked, and are secured to the forward axle B' at the opposite sides of the forward end of the frame D.

The device K L M N thus formed serves a threefold purpose: first, as a support for the operator to take hold of to keep himself in position; second, as a steering device to enable the operator to guide the machine; and, third, to enable the operator to increase the working power of his weight by lifting upon the said handle K. The bar L may be made of such a length that it may be used by a person sitting upon the seat T, for guiding the carriage.

O are the brake-shoes, which are attached to the outer ends of the bar P, which is bent four times at right angles, so as to pass beneath the frame D and its tie-rods, and is pivoted to the side bars of the said frame D at such a distance from its upper angles as will give the necessary throw to the brake-shoes O.

To the bar P below its pivoting-points is pivoted the end of a connecting-bar, Q, the other end of which is pivoted to the lower end of the lever R. The lever R is pivoted to the side bar of the frame D, and its upper end projects into such a position that it may be reached and operated by the operator, whether standing upon the foot-rests H or sitting upon the seat T.

U are downwardly-projecting arms attached to the side bars of the frame D below the ends of the pivot-bar $g^2$, and which may be the downward extension of the supports for said bar.

V are tie-rods, which pass across the lower ends of the arms U, pass through holes in the end parts of the end bars of the frame D, and have nuts screwed upon their ends, so that the tie-rods V may be put under any desired tension by screwing up the said nuts.

Having thus described my invention, I claim as new and desire to secure by Letters Patent—

1. The combination, in a velocipede, with wheels F F that turn axle B, of the levers G G, pivoted at $g^2$, having arc-slot and teeth $g^1$ at the weight ends, and provided with treadles at the power ends, as and for the purpose described.

2. The levers G G, rods I, and levers J, arranged in a velocipede with respect to seat, as and for the purpose set forth.

3. The adjustable foot-rests H, formed of the two plates, the interposed springs, and the socket, and its spring and cross-pin, in combination with the levers G, substantially as herein shown and described.

4. The combination of the handle K, the curved adjustable bar L, and the branched supporting-bars N M with the forward axle B', substantially as herein shown and described.

ALONZO MONROE BUCHANAN.

Witnesses:
W. W. PORTER,
B. F. MAHAN.